United States Patent Office 3,850,959
Patented Nov. 26, 1974

3,850,959
SUBSTITUTED ALDEHYDES
André Allais, Les Lilas, and Jean Meier, Coeuilly-Champigny, and Jacques Dubé, Eaubonne, France, assignors to Roussel-UCLAF, Paris, France
No Drawing. Continuation-in-part of application Ser. No. 243,455, Apr. 12, 1972, now Patent No. 3,772,332, dated Nov. 13, 1973, which is a continuation of abandoned application Ser. No. 55,221, July 15, 1970. This application Sept. 13, 1973, Ser. No. 396,703
Claims priority, application France, July 18, 1969, 6924537
Int. Cl. C07d 65/04; A61k 27/00
U.S. Cl. 260—327 TH                    4 Claims

ABSTRACT OF THE DISCLOSURE

Novel aldehydes of the formula

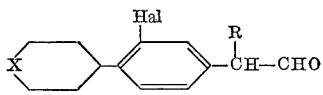

wherein Hal is halogen, R is alkyl of 1 to 4 carbon atoms and X is selected from the group consisting of oxygen and sulfur which are useful as intermediates for the preparation of the corresponding phenylacetic acid derivatives and as anti-inflammatory agents.

PRIOR APPLICATION

This application is a continuation-in-part of copending, commonly assigned U.S. patent application Ser. No. 243,455, filed Apr. 12, 1972, now U.S. Pat. No. 3,772,332, patented Nov. 13, 1973, which in turn is a streamline continuation of application Ser. No. 55,221, filed July 15, 1970, now abandoned.

STATE OF THE ART

Compounds useful for treatment of inflammatory conditions such as observed in evolutionary phases of rheumatism fall into 3 groups independent from cortisones: anti-inflammatory-analgesic group, anti-pyretic group, analgesic and anti-malarial group. These classes differ substantially in their method of activity. Some have immediate curative effect of short duration while the others, particularly the antimalarial group, have a late therapeutic activity generally appearing only after a treatment time of several weeks.

The preferred drugs for treatment of rheumatism conditions are the anti-inflammatory-analgesic class because of their rapid and general use and the success of recent medicaments with more and more active anti-rheumatic products necessitates the use of lower and lower daily doses or lower and lower minimum blood levels.

The recently attained therapeutic progress is not only reflected in their values. The anti-rheumatism medicaments have, in therapeutic practice, raised often conflicting medical evaluations without relation to their activity as anti-inflammatory activity. One of the determining reasons for this disagreement resides in the fact that their use requires generally prolonged treatment at important dosages and therefore the products must not cause any toxic phenomena or intolerance phenomena.

According to Domenjoz [Aspects de la Chimiotherapie Antirhumatismale, Chimie. Thera. II, (1967), p. 285], the "good tolerance" and "low toxicity" conditions are only partially achieved by presently available products which means that insufficient activity is not what has been criticized but the frequency and seriousness of the side effects. For this reason, research in this field should be directed toward better tolerated products and particularly for anti-inflammatory agents with greater therapeutic index than those currently available.

Therefore, it is desired to have available extremely active anti-inflammatory compounds of a type that they can be administered in sufficiently low dosages so that the appearance of toxic phenomena, modifications of blood count and particularly undesirable effects on gastric and intestinal mucous membranes need not be feared in prolonged treatment.

OBJECTS OF THE INVENTION

It is an object of the invention to provide the novel compounds of formula I.

It is another object of the invention to provide novel therapeutic compositions and novel methods of treating inflammation and pain in warm-blooded animals.

These and other objects and advantages of the invention will become obvious from the following detailed description.

THE INVENTION

The novel phenylacetaldehyde compounds of the invention are compounds of the formula

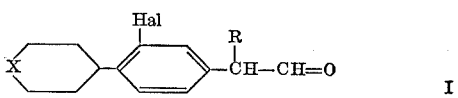

wherein X is selected from the group consisting of oxygen and sulfur, R is alkyl of 1 to 4 carbon atoms and Hal is halogen. X is preferably oxygen, Hal is preferably bromine or fluorine or most preferably chlorine and R is preferably methyl or ethyl.

The process of the invention for the preparation of compounds of formula I comprises condensing in an anhydrous medium in the presence of an alkaline condensation agent such as an alkali metal alcoholate or amide an alkyl haloacetate with a compound of the formula

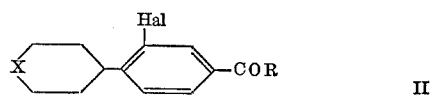

wherein X, R and Hal have the above definition to obtain the corresponding epoxy compound of the formula

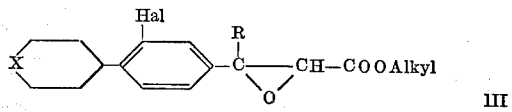

subjecting the later to alkaline hydrolysis followed by acidification to obtain a compound of the formula

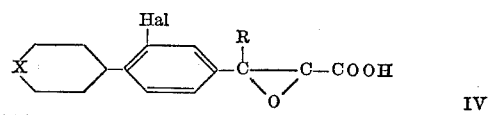

subjecting the latter to decarboxylation by known means to obtain a compound of the formula

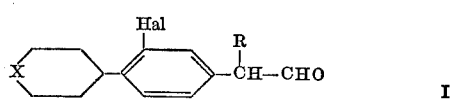

and the resulting aldehyde may be reacted with an oxidation agent to obtain an acid of the formula

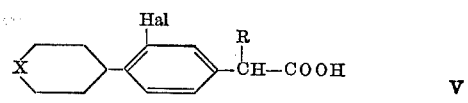

wherein X is oxygen or oxidized sulfur and when X is oxidized sulfur, the compound is subjected to a reducing agent.

The compounds of formula V are useful as anti-inflammatory and analgesic agents, as disclosed in the parent application Ser. No. 243,455.

In a preferred embodiment of this process, the alkaline hydrolysis of compounds of formula III is effected with an alkali metal base such as sodium hydroxide or potassium hydroxide and the acidification is effected with an inorganic acid such as hydrochloric acid or sulfuric acid. The decarboxylation is effected by heating an alkali metal salt of the acid of formula IV in the presence of calcium oxide. The oxidation of the aldehyde of formula I may be effected with a sulfochromic mixture with a peracid such as perphtalic acid or with silver nitrate. The reducing agent can be a metal such as iron, tin or zinc in the presence of an aqueous acid such as hydrochloric acid or acetic acid or stannous chloride in concentrated hydrochloric acid or preferably triphenylphosphine or phosphorus trichloride.

The anti-inflammatory compositions are comprised of an effective amount of a compound of formula I and a major amount of a pharmaceutical carrier. The compositions may be in the form of injectable solutions or suspensions in ampoules or multidoes flacons, in the form of tablets, coated tablets, capsules, syrups, gelules, drinkable solutions or suspensions, pomades, creams or topical powder or suppositories prepared in the usual manner. The compositions are very active and the active ingredient is administered at very low doses and is well tolerated.

The pharmaceutical carrier or excipient may, for example, be aqueous or non-aqueous solvents, talc, lactose, amidon, magnesium stearate, gum arabic, cacao butter, paraffinic derivatives, glycols, preservatives and/or diverse wetting, dispersing an emulsifying agents.

Because of their anti-inflammatory activity, the compositions are useful for the treatment of inflammatory conditions such as rheumatism affections, arthritis, lumbagos and zonas or as a complimentary treatment in infections or feverish states.

The novel method of relieving inflammation in warm-blooded animals comprises administering to warm-blooded animals and anti-inflammatorily effective amount of at least one compound of formula I. The compounds may be administered orally, rectally, parenterally or locally by topical application to the skin or mucous membranes. The usual useful daily dose is 0.1 to 50 mg./kg. depending upon the product and the method of administration.

In the following examples there are described several preferred examples to illustrate the invention. However, it should be understood that the invention is not intended to be limited to the specific embodiments.

EXAMPLE 1

α-[4-(4'-tetrahydropyranyl)-3-chloro-phenyl]propanal

STEP A.—Ethyl β-methyl-β-[4-(4'-tetrahydropyranyl)-3-chlorophenyl]-glycidate

A solution of 12.9 g. of 3-chloro-4(4'-tetrahydropyranyl)-acetophenone in 120 ml. of toluene was cooled to —10° C. and 18.3 ml. of ethyl chloroacetate were added at —10° C. followed by addition over an hour of a solution of 4.02 g. of sodium in 110 ml. of ethanol. The temperature was returned to room temperature and the mixture was stirred for 48 hours at room temperature. The volatile fraction was distilled off under reduced pressure and the residue was added to a mixture of water, ether and ice. The mixture was stirred and the ether phase was recovered by decantation, was washed with water, dried, treated with activated carbon, stirred and filtered. The filtrate was concentrated to dryness by distillation under reduced pressure to obtain 16.5 g. of raw ethyl β-methyl-β-[4-(4'-tetrahydropyranyl)-3-chlorophenyl]-glycidate which was used as is for the next step.

STEP B.—Sodium β-methyl-β-[4-(4'-tetrahydropyranyl)-3-chlorophenyl]-glycidate 1.2 g. of sodium were dissolved under an inert atmosphere in 125 ml. of ethanol and 16.45 g. of the raw product of Step A were added to this solution. The mixture was stirred until dissolution occured and after the addition of 0.95 ml. of water, the mixture was stirred at room temperature for 15 hours. The mixture was poured into ether and was stirred. The precipitate formed was recovered by vacuum filtration and was dried to obtain 12.5 g. of sodium β-methyl-β-[4-(4'-tetrahydropyranyl)-3-chlorophenyl]-glycidate.

STEP C.—acemic α-[4-(4'-tetrahydropyranyl)-3-chlorophenyl]-propanal 22 ml. of aqueous 2 N hydrochloric acid solution were added to a solution of 12.5 g. of the sodium salt of Step B in 300 ml. of water formed under an inert atmosphere and the mixture was stirred and refluxed until carbon dioxide gas stopped evolving which took about 6 hours. After cooling, the mixture was extracted with ether and the ether phase was washed with water, an aqueous sodium bicarbonate solution and then with water. The solution was dried, treated with activated carbon, stirred and filtered. The filtrate was concentrated to dryness by distillation under reduced pressure to obtain 7.5 g. of racemic α - [4 - (4' - tetrahydropyranyl) - 3 - chlorophenyl]-propanol whose semicarbazone melted at 214° C. The product was characterized by thin-layer chromatography with an $R_f=0.64$ using a silica gel support and a 3–2 chloroform-acetone mixture as the eluant.

EXAMPLE 2

Racemic α-[4-(4'-tetrahydropyranyl)-3-chlorophenyl] propionic acid

A solution of 8.35 g. of silver nitrate in 17 ml. of water was added to a solution of 4.15 g. of racemic α-[4-(4'-tetrahydropyranyl)-3 - chlorophenyl] - propanol in 42 ml. of ethanol and then a solution of 5 g. of sodium hydroxide in 10 ml. of water was added progressively. The mixture was stirred for 2 hours at room temperature and was then filtered. The filerate was distilled to remove ethanol under reduced pressure and was added to an aqueous hydrochloric acid solution. The precipitate formed was recovered by vacuum filtration and was dissolved in ether. The ether solution was washed with water and charcoal and sodium sulfate were added thereto. The mixture was stirred and filtered and the filtrate was distilled to dryness under reduced pressure. The residue was crystallized from isopropyl ether to obtain α-[4-(4'-tetrahydropyranyl)-3-chlorophenyl]-propionic acid.

EXAMPLE 3

400 mg. tablets were prepared by admixing 50 mg. of α-[4-(4'-tetrahydropyranyl) - 3 - chlorophenyl]-propanal and 350 mg. of an excipient composed of lactose, talc, amidon and magnesium stearate.

PHARMACOLOGICAL DATA (A) Anti-inflammatory activity—preventive treatment

An injection of a Freund type adjuvant into the rear paw of a rat provokes the appearance of a primary inflammatory lesion in the paw, then after a latency time of the order of 15 days, there was a release of a secondary arthritis affecting the other rear paw as well as the front paws, the tail and the ears. From zero day of the test, male rats weighing about 150 g. received an injection in the rear paw of 0.1 ml. of an adjuvant consisting of a suspension of 6 mg./ml. of dead butyric mycobacteria in mineral oil. The animals received orally the compound of Example I from day zero to the 17th day. Arthritic control animals received only the adjuvant and normal control animals received nothing.

On the 17th day, the increase in volume of the rear paws as compared to the normal controls was measured and the dosage of α-2M glycoprotein absent in the normal rat was effected but an inflammatory state was clearly evident. The presence or absence of arthritic lesions in the ears, tail and front paws was also noted. All these attributes were expressed as averages of the conventional notation and the addition of the ratings constituted an arthritic index. The test results were expressed finally as the $DA_{40}$ dose which reduced by 40% the arthritic index. The $DA_{40}$ dose for the product of Example I was 0.8 mg./kg.

(B) Anti-inflammatory test

The test used was that described by Jequier et al. [Arch. Int. Pharmacodyn., vol. 152 (1954), p. 15] in which rats weighing about 150 g. received a single injection of 1 mg. of naphthoylheparamine in the rear paw to provoke formation of an inflammatory edema. The test products were administered orally in an aqueous suspension one hour before the irritant injection and the volume of the paw was measured immediately after and 2 hours after the irritant injection. The increase in the paw volume represented a degree of inflammation and the $DA_{40}$ dose which reduced the inflammation by 40% was determined to be 0.35 mg./kg. for the product of Example I.

Various modifications of the products and process of the invention may be made without departing from the spirit or scope thereof and it should be understood that the invention is to be limited only as defined in the appended claims.

We claim:
1. A compound of the formula

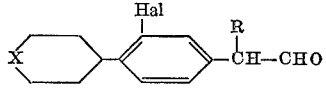

wherein Hal is halogen, X is selected from the group consisting of oxygen and sulfur and R is alkyl of 1 to 4 carbon atoms.

2. A compound of claim 1 wherein X is oxygen.
3. A compound of claim 1 wherein Hal is chlorine.
4. A compound of claim 1 wherein R is selected from the group consisting of methyl and ethyl.

References Cited
UNITED STATES PATENTS 3,772,332  11/1973  Allais et al. _____ 260—327TH HENRY R. JILES, Primary Examiner C. M. S. JAISLE, Assistant Examiner U.S. Cl. X.R.

424—275